United States Patent [19]
Grote

[11] Patent Number: 5,892,859
[45] Date of Patent: Apr. 6, 1999

[54] INTEGRATED CIRCUIT COMPATIBLE ELECTRO-OPTIC CONTROLLING DEVICE FOR HIGH DATA RATE OPTICAL SIGNALS

[75] Inventor: James G. Grote, Yellow Spings, Ohio

[73] Assignee: The United States of America as represented by the Secretary of the Air Force, Washington, D.C.

[21] Appl. No.: 872,897

[22] Filed: Jun. 11, 1997

[51] Int. Cl.⁶ .................................................. G02B 6/10
[52] U.S. Cl. ............................... 385/2; 385/122; 385/8; 385/16; 385/131
[58] Field of Search ...................... 349/196, 197; 385/2, 122, 129, 130, 131, 8, 16, 147; 359/900

[56] References Cited

U.S. PATENT DOCUMENTS

| | | | |
|---|---|---|---|
| 4,887,884 | 12/1989 | Hayden | 350/96.29 |
| 5,282,078 | 1/1994 | Horsthuis | 359/328 |
| 5,283,685 | 2/1994 | Horsthuis | 359/332 |
| 5,289,308 | 2/1994 | Horsthuis et al. | 359/328 |
| 5,555,326 | 9/1996 | Hwang et al. | 385/2 |
| 5,569,565 | 10/1996 | Kawakami et al. | 385/131 |
| 5,594,093 | 1/1997 | Sotoyama et al. | 528/358 |

*Primary Examiner*—Hung N. Ngo
*Attorney, Agent, or Firm*—Gina S. Tollefson; Gerald B. Hollins; Thomas L. Kundert

[57] ABSTRACT

A commercially attractive arrangement for monolithic integration of a nonlinear optical polymer transverse electro-optic device for high data rate optical signals on an electronic integrated circuit chip. The invention provides for conductive polymer sheet layers immediately adjacent to an optical signal transmitting nonlinear optical polymer core layer. Electrically passive polymer cladding layers are also provided adjacent to the conductive polymer sheet layers to achieve lower optical signal losses. The combination provides a reduced nonlinear optical polymer core layer poling voltage, reduced device length, and 5 VDC or less controlling voltage, allowing inclusion into electronic integrated circuit chips of a size compatible with multichip module integration.

19 Claims, 6 Drawing Sheets

INTEGRATED CIRCUIT COMPATIBLE ELECTRO-OPTIC CONTROLLING DEVICE FOR HIGH DATA RATE OPTICAL SIGNALS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of electro-optic switching and modulating devices and more particularly to electro-optic switching and modulating devices comprised of nonlinear optical polymer material.

As optical data processing circuits approach multigigahertz operation rates, the need arises for optical signal transmission for multichip module-to-multichip module interconnection on a common board and for board-to-board interconnection through a common backplane. Currently employed electrical interconnects become impractical at multigigahertz operating rates due to electromagnetic interference and excessive power loss. As electrical interconnects are replaced with optical interconnects there will be a need for transverse electro-optic devices for signal routing control and signal modulation for high data rate optical signals. For purposes of this invention, high data rate optical signals are defined as those exceeding 10 gigabits per second. Nonlinear optical polymer transverse electro-optic devices have several attractive characteristics which many researchers have tried to capitalize on in the past decade in an effort to realize electro-optic modulators and switches for multichip module-to-multichip module and board-to-board optical interconnects for high data rate optical signals. Nonlinear optical polymers have the property for which a polarization and, hence, a birefringence can be induced by an applied electric field and includes organic-based materials, inorganic-based materials and, ceramic materials, as well as combinations and mixtures thereof.

A top view of a transverse electro-optic directional coupler switch is represented in the drawing of FIG. 1. As the basic form of a 2-input×2-output optical switch, the directional coupler, shown in FIGS. 1a and 1b is known, with FIG. 1a showing a directional coupler without applied switching voltage and FIG. 1b showing a directional coupler with applied switching voltage. A directional coupler type of electro-optic switch is one which controls transfer of an optical signal from one channel waveguide to another by both voltage independent and voltage dependent phase changes. A "transverse" electro-optic controlling device refers to an electro-optic device where the optical signal is traveling normal to the applied electric field or parallel to the electrodes. The applied voltage causes a change in the dielectric properties of the material and hence renders a change in the index of refraction of the material in the switch's coupling portion which introduces a π/2 phase change through an electro-optic effect. The FIG. 1a top view illustrates a directional coupler having ridge type waveguides etched in a layer of nonlinear optical polymer material and passive polymer material.

Parallel channel waveguides separated by a finite distance for receiving an optical signal are represented in both FIGS. 1a and 1b at 101, 102 and 112 and 113, respectively. A single optical input signal is considered for purposes of the present discussion; this signal is represented by the bold arc at 103 and 114 in FIGS. 1a and 1b, respectively. A symmetric mode component of this optical signal, as represented at 105, and an antisymmetric mode of the optical signal as represented at 104 in FIG. 1a and at 116 and 115 in FIG. 1b, respectively, is generated upon the optical signal entering the directional coupler because of the mode coupling properties of two adjacent optical waveguides with small separation and these modes travel along the length of the channel or switch, over such lengths as are represented at 106 and 121 in FIGS. 1a and 1b respectively. The phase of the two modes shift as the respective signals travel the length of the waveguides, as is represented in the dotted, curving lines, shown at 108 in FIG. 1a and at 119 in FIG. 1b and the solid, curving lines shown at 107 and 120 in FIGS. 1a and 1b respectively. The symmetric mode is the mode of propagation within the waveguide region in which the optical signal is launched and the antisymmetric mode, the mode of propagation within the other waveguide region. With no voltage applied to the FIG. 1 switches, complete transfer of light from one channel to the next occurs at a distance that introduces a voltage independent π/2 phase shift to the modes so that one mode couples completely to the other. Complete mode coupling and light transfer occurs at the output waveguides at 126 in FIG. 1a and thereafter the complete optical signal at 111 exits the waveguide at 128 in FIG. 1a.

Applying an electric field to one of the channels of the directional coupler of FIG. 1b over the distance L represented at 121 from the voltage source shown at 122 in FIG. 1b will alter the dielectric properties of the coupler's nonlinear material subjected to the electric field, hence changing the index of refraction of the material and introducing a voltage dependent π/2 phase shift in the signal modes 115 and 116 and thereby switching the waveguide through which the optical signal exits from 129 to 130 as represented at 125 in FIG. 1b.

Similarly, electro-optic modulation is a rotation of the polarization of the optical signal due to an applied electric field. Maximum modulation occurs at an electric field that induces a π/2 polarization rotation.

Past research has focused on exploiting the electro-optic properties of nonlinear optical polymers with optimized optical, structural and mechanical properties in an attempt to achieve high performance nonlinear optical polymer transverse electro-optic devices, such as switches and modulators. Nonlinear optical polymers have several attractive potential characteristics on which many researchers have tried to capitalize over the past decade. These include a high electro-optic coefficient enabling low voltage operation, a low dielectric constant for high speed modulation, low temperature processing enabling integration of optics with electronics, excellent refractive index match with optical fiber materials and simplified fabrication for lower cost. A prior art conventional nonlinear optical polymer transverse electro-optic device is shown in cross-section in FIG. 2. FIG. 2 illustrates a nonlinear optical polymer core layer at 201; the optical signal is transmitted through waveguides. Passive polymer cladding layers are located at 202 and 203 in FIG. 2 and these layers operate to confine the optical signal within the core layer and limit propagation losses. Metal layers, or electrodes, initially used for poling the FIG. 2 device and during operation used for providing switching voltage are shown at 204 and 205 in FIG. 2. A voltage applied to the upper electrode 204 produces an electric field between the upper and lower electrodes, across the core polymer layer at 201 and hence changes the dielectric properties of the material, which in turn renders a change in the refractive index of the material. This is an electro-optic effect that produces a voltage dependent π/2 phase shift in the layer 201 communicated signal modes, causing the optical signal to switch from one waveguide to the next in the layer 201 of the FIG. 2 structure.

Several technical barriers have heretofore prevented the use of nonlinear electro-optic polymers from progressing toward commercialization much further than research devices. One of the barriers is the poling voltage requirements of such polymers. In order to align the molecules in the nonlinear optical polymer core layer 201 in FIG. 2, for example, the polymer must be "poled" once prior to the initial operation; i.e., the polymer material must be heated and subjected to a high voltage to secure the desired nonlinear optical properties of the material. The polymer material may need poling at other times during the life of the device in the event the design parameters of the device have been exceeded. For example, if the device is exposed to a temperature outside the its design parameters, the nonlinear characteristics of the polymer core layer will be lost and the material will have to be poled again. A conventional nonlinear optical polymer transverse electro-optic device with three layers of polymer material between electrodes—two cladding layers and a core layer—totaling six to eight micrometers of thickness, for example, results in a poling voltage requirement of 900 to 1200 volts (150 volts per micron of polymer thickness). Voltage levels of these magnitudes prevent easy integration of these electro-optic devices with electronics because the poling of any such electro-optic device fabricated on a single chip with other electrical devices would effectively cause high voltage damage to the other electronic and electro-optic circuit devices at the time the polymer was poled. The electro-optic device, therefore, cannot be poled insitu within an electronic integrated circuit and must be poled external to the electronic circuit. This makes monolithic integration within integrated circuits impractical. The impracticality stems from the fact that the device is fabricated and poled separately from the electronic circuit on another substrate. To interface with the electronic circuit, the conventional electro-optic device must therefore be properly aligned with the other chip components and glued in place. These steps add to the complexity of manufacturing and are much less fabrication tolerant; moreover, the poling operation may be difficult if not impossible to perform at a later time during the operating life of the device if the polymer loses its nonlinear properties.

Another barrier that has prevented nonlinear optical polymer transverse electro-optic devices from progressing much past the research stage is the required device length. Conventional switching devices are typically 14 to 27 millimeters in length. Such a length is required in a conventional nonlinear optical polymer transverse electro-optic device, for example, to enable use at a reasonable switching voltage. However, such a length also prevents integration of the device into integrated electronic circuits or electronic multichip modules.

The present invention overcomes the barriers to commercial use of nonlinear electro-optic polymers for use in fabricating electro-optic devices. Using the method and device of the present invention, it is feasible to have an array of these switches in an integrated circuit chip small enough to place within a multichip module. Also, monolithic integration with electronic circuits as well as insitu poling are possible.

SUMMARY OF THE INVENTION

The present invention provides a commercially attractive arrangement for integration of high data rate transverse electro-optic devices on electronic integrated circuit chips. The invention provides for electrically conductive polymer sheet layers immediately surrounding an optical signal transmitting nonlinear optical polymer core layer in addition to passive polymer cladding layers, which results in a reduced poling voltage and reduced size, allowing inclusion into integrated circuit chips of a size compatible with multichip module integration and insitu poling.

It is an object of the present invention to provide an electro-optic switch of short length and minimal thickness capable of switching high data rate optical signals.

It is an object of the present invention to provide conductive polymer cladding sheets adjacent to the core layer of a nonlinear optical polymer transverse electro-optic device including switches, modulators and interferometers.

It is another object of the present invention to decrease the separation between electrodes for a nonlinear optical polymer transverse electro-optic device.

It is another object of the invention to provide lower poling voltage for a nonlinear optical polymer transverse electro-optic device.

It is another object of the invention to provide a shorter length nonlinear optical polymer transverse electro-optic device.

It is another object of the invention to provide a nonlinear optical polymer transverse electro-optic device size compatible with an electronic integrated circuit chip capable of multichip module integration.

It is another object of the invention to provide the capability to pole a nonlinear optical polymer transverse electro-optic device insitu within electronic circuit devices on a single integrated circuit chip.

Additional objects and features of the invention will be understood from the following description and claims and the accompanying drawings.

These and other objects of the invention are achieved by a minimal propagation loss and integrated circuit size-compatible electrically controlled nonlinear optical polymer-based transverse electro-optic device for switching and modulating a high data rate optical signal comprising:

a first electrically grounded metal layer overlaying a substrate layer and functioning as an electrical ground electrode;

a first electrically passive polymer cladding layer overlaying said first metal layer and including therein an aperture communicating with said grounded metal layer;

a first electrically conductive polymer sheet layer overlaying said first electrically passive polymer layer, said electrically conductive polymer sheet layer including an integral portion extending through said aperture of said first electrically passive polymer layer and making electrical contact with said first electrically grounded metal layer;

an optical signal transmitting nonlinear optical polymer core layer having electrically alterable molecular structure and optical refraction properties;

said nonlinear optical polymer core layer being capable of transmitting said optical signal in a predictably altered path therein upon application of a transverse electric field thereto;

a second electrically conductive polymer sheet layer overlaying said optical signal transmitting nonlinear optical polymer core layer, said first and second conductive polymer sheet layers being capable of establishing an electric field region encompassing said optical signal transmitting nonlinear optical polymer core layer in said electro-optic device;

a second electrically passive polymer cladding layer overlaying said second electrically conductive polymer sheet layer including an electrical conductor-receiving aperture therethrough;

a second metal layer overlaying said second electrically passive polymer cladding layer and interfacing an electro-optic device controlling electrical signal voltage source with extension of said second electrically conductive polymer sheet; and an electrical conductor member extending from said second electrically conductive polymer sheet layer through said conductor receiving aperture of said second electrically passive polymer cladding layer to said second metal layer.

DETAILED DESCRIPTION

The present invention provides reduced device length and reduced poling voltage for nonlinear optical polymer transverse electro-optic devices for high data rate optical signals. The invention provides electrically conductive polymer sheet layers immediately adjacent to the nonlinear optical polymer core layer of such an electro-optic device in addition to passive polymer cladding layers. The use of electrically conductive polymer sheet layers results in reduced separation between electrodes and hence reduced device length and reduced poling voltage for the electro-optic device, allowing inclusion of such devices into integrated circuit chips of a size compatible with multichip integration. The nonlinearity of the polymer core layer is significant in such devices because it possess the properties that allow electro-optic switching and modulation. The greater the nonlinearity, the lower the switching or modulation voltage required and the shorter the device length for a fixed separation between electrodes. Also, the combination of electrically conductive polymer sheet layers and passive polymer cladding layers provides switching or modulation of high data rate signal propagation paths with minimal propagation loss.

Figure 1A:
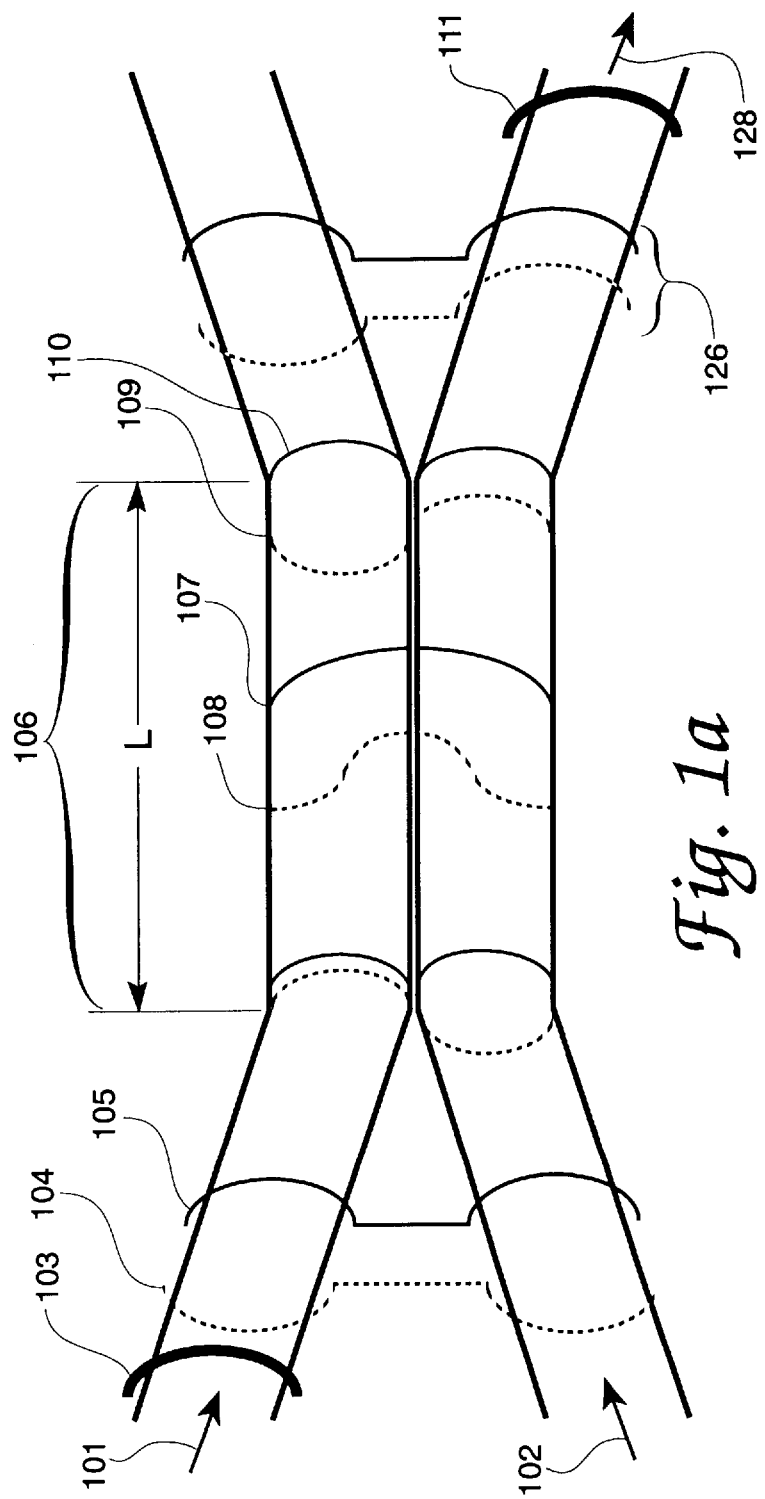
FIG. 1a shows a top view of a transverse electro-optic directional coupler switching device.
Figure 1B:
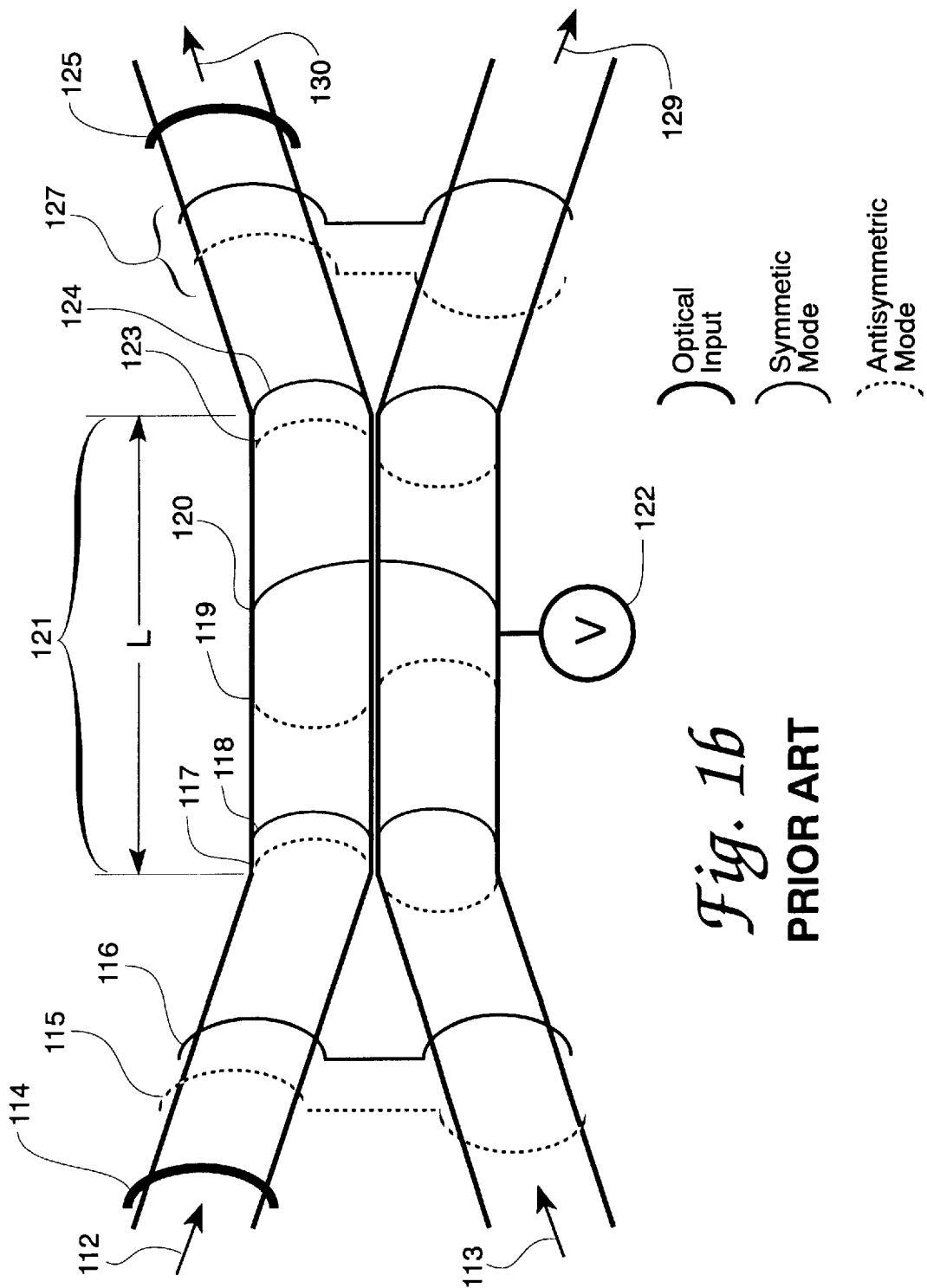
FIG. 1b shows a top view of a transverse electro-optic directional coupler switching device with an applied switching voltage.
Figure 2:
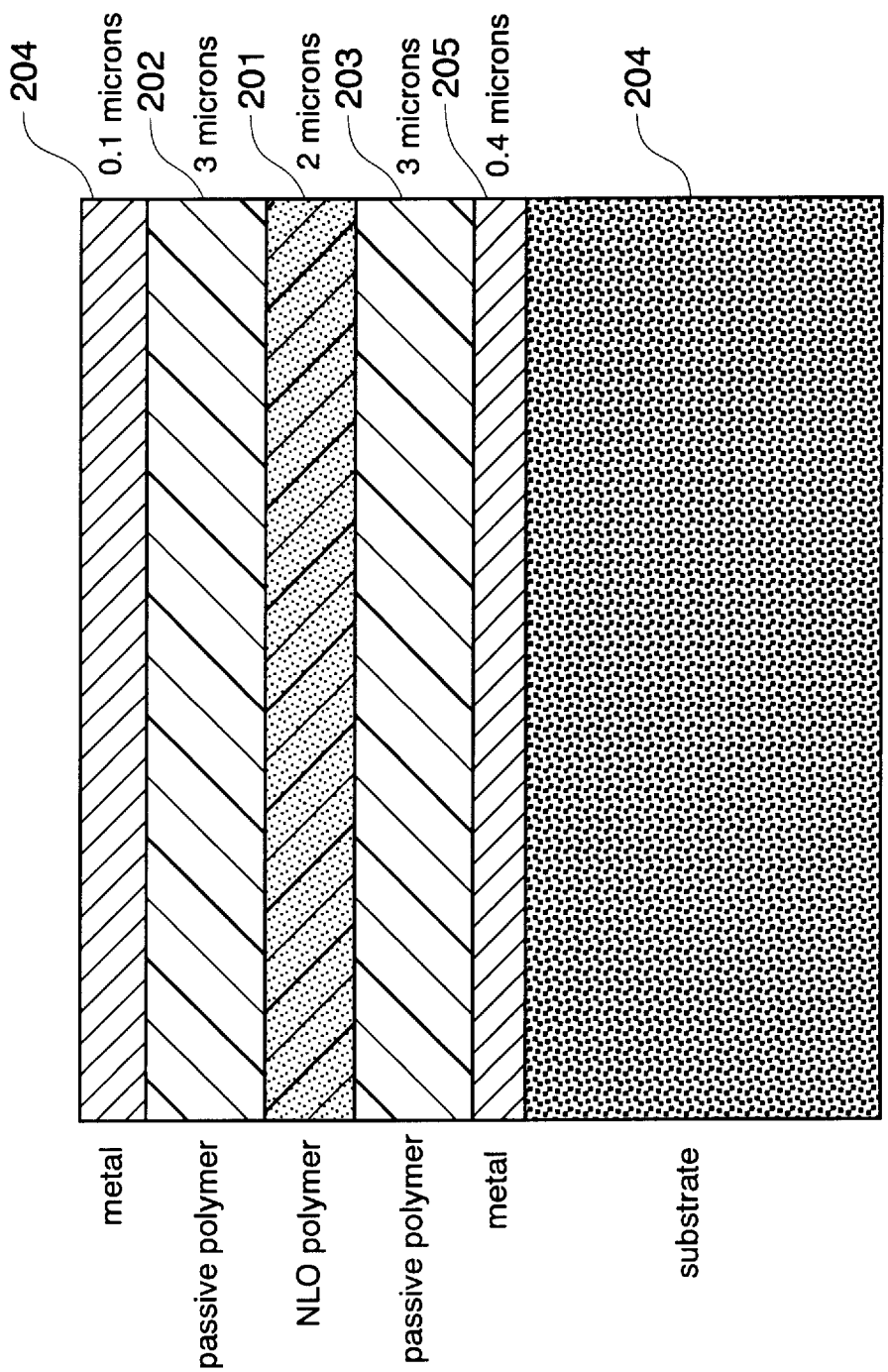
FIG. 2 shows a cross-sectional view of a conventional nonlinear optical polymer transverse electro-optic device.

From bottom to top, the transverse electro-optic device of the present invention comprises a substrate, a metal electrode layer, a passive polymer cladding layer, a conductive polymer sheet layer, a nonlinear optical polymer core layer, a second conductive polymer sheet layer, a second passive polymer cladding layer and a second metal electrode layer. The substrate may house all of the electronic circuits used in conjunction with the electro-optic device. In contrast, as described previously in FIG. 2, a conventional nonlinear polymer transverse electro-optic device fabricated on a substrate includes a metal electrode layer, a passive polymer cladding layer, a nonlinear optical polymer core layer, a second passive polymer cladding layer and a second metal electrode layer. In the present invention, a thin, electrically conductive polymer layer, or sheet, adjacent the nonlinear optical polymer core layer produces the surprising ultimate result of reducing device length, minimizing propagation loss and requiring much lower poling voltage and switching voltage than that required with conventional nonlinear optical polymer transverse electro-optic devices.

Figure 3:
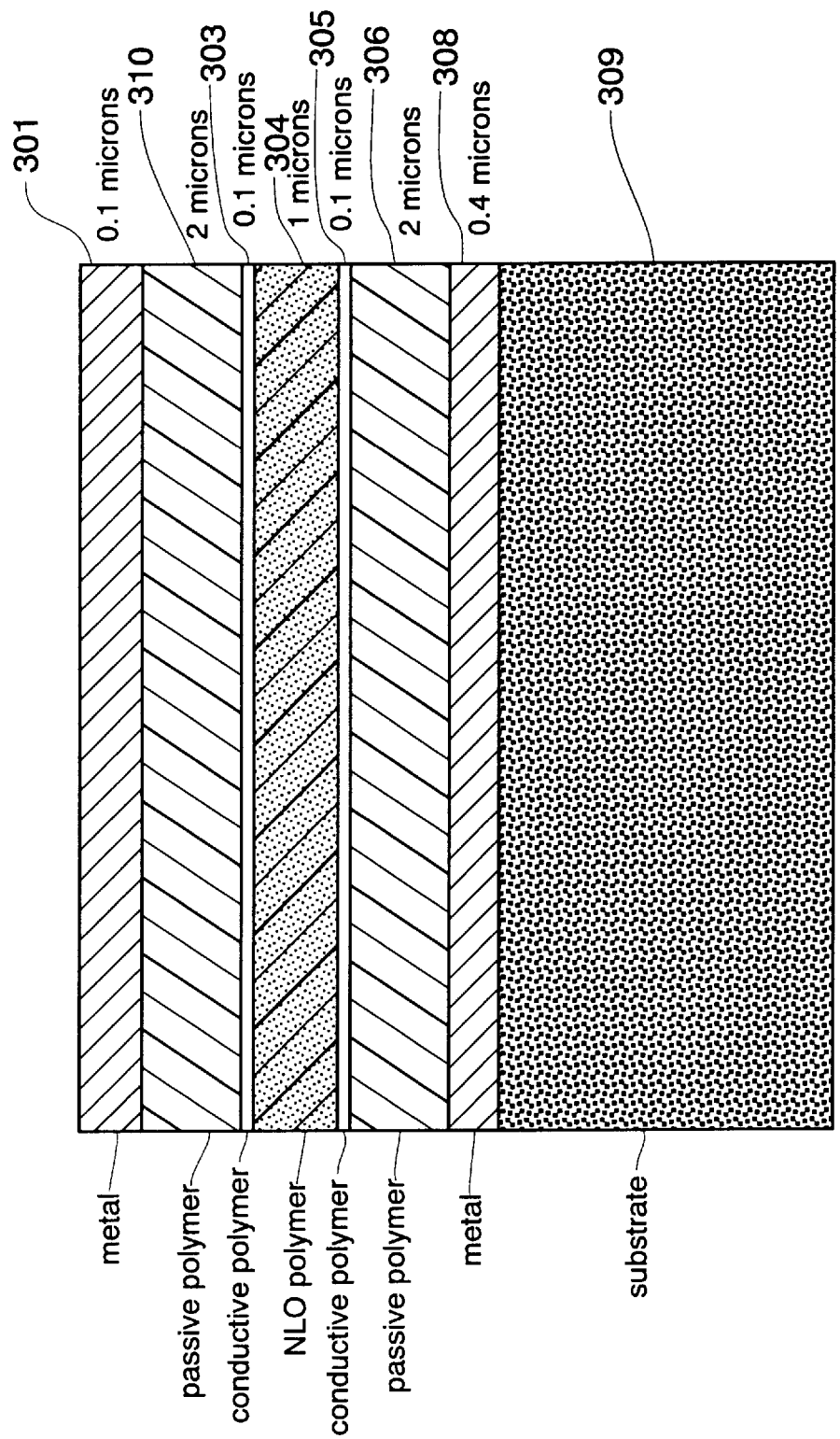
FIG. 3 shows a cross-sectional view of a nonlinear optical polymer transverse electro-optic device in accordance with the present invention.

FIG. 3 is a cross-sectional view of the layer arrangement of the present invention. The nonlinear optical polymer core layer at 304 having a thickness of one micron, is shown sandwiched between the conductive polymer sheet layers at 303 and 305, each conductive polymer sheet having a thickness of 0.1 micron. Adjacent each conductive polymer sheet layer, on a side opposite the nonlinear optical polymer core layer 304, is an electrically passive polymer cladding layer, shown at 310 and 306, each having a thickness of two microns. The passive polymer cladding layer 310 contains an aperture or pathway, shown at 302, which contains a deposit of metal material, an extension of metal layer 301. Similarly, the passive polymer cladding layer 306 contains an aperture or pathway, shown at 307, which contains a deposit of electrically conductive polymer material, an extension of the electrically conductive polymer sheet layer 305. A layer of metal 301 is deposited on top of the optical layers in FIG. 3 and a second metal layer 308 is deposited prior to forming the optical layers on top of the substrate at 309.

The FIG. 3 layer of metal 301 provides a physical interface with other electro-optic device components and electronic circuits and the metal layer at 308 functions as an electrical ground plane. A voltage source, not shown, is connected between metal layers 301 and 308 and the voltage establishes an electric field region therebetween, through the passive polymer cladding layer at aperture 302, which contains a metal material, to the electrically conductive polymer sheet layer at 303. An electrical field is then created across the nonlinear optical polymer core layer 304 between conductive polymer cladding sheets 303 and 305. The electric field generated by the voltage source encompasses conductive polymer sheet layer 305 through the extension of such sheet layer at 307 within the aperture or pathway of passive polymer layer 306 and terminates at the electrical ground metal layer 308. For manufacturing convenience, the apertures within the passive polymer cladding layers contain in one instance metal from the top metal layer, and in the second instance conductive polymer, although both materials are electrically conductive and function to minimize the distance the voltage generated electric field extends. Therefore, electrically conductive polymer sheet layers 303 and 305 operate as electrodes and are used to initially pole the nonlinear optical polymer material before operation of the device and to provide the electric field which accomplishes optical switching during operation of the device. By contrast, in conventional nonlinear optical polymer transverse electro-optic devices, the layers of metal perform each of these functions. The separation distance between effective electrode layers—i.e., the separation distance between conductive polymer sheet layers—which equates to the thickness of the nonlinear optical polymer core layer—is significantly reduced in the arrangement of the present invention. The decrease in the separation or thickness distance between effective electrode layers in the present invention results in benefits which make the present invention attractive for commercial electronic integrated circuit and multichip module applications where conventional devices have heretofore been lacking.

Figure 4A:
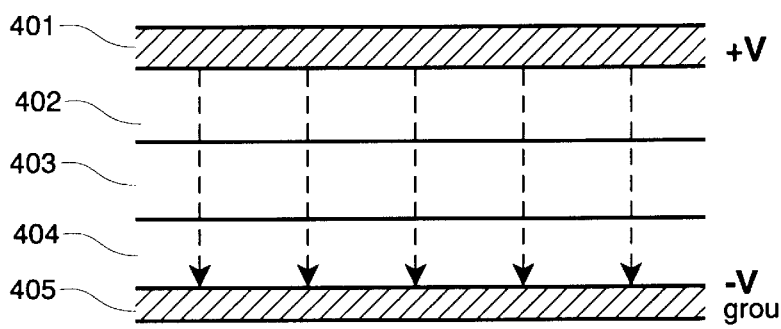
FIG. 4a shows the electric field applied to a conventional nonlinear optical polymer transverse electro-optic device.
Figure 4B:
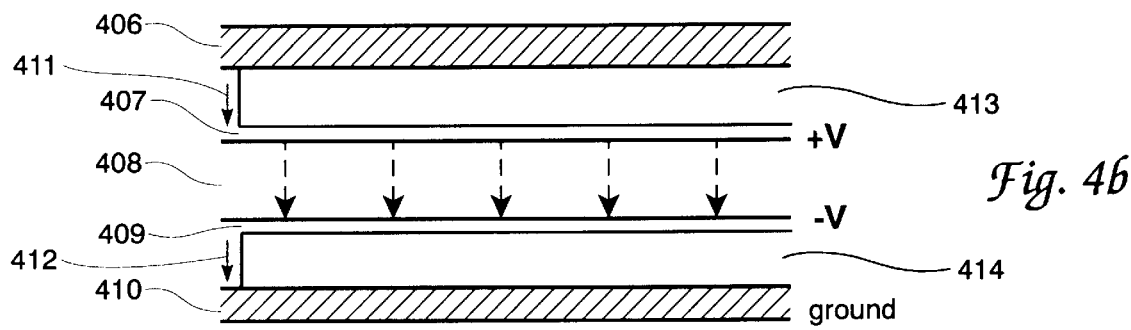
FIG. 4b shows the electric field applied to a nonlinear optical polymer transverse electro-optic device in accordance with the present invention.

The first of these benefits is that the voltage required for poling the device prior to operation is reduced. Electric field poling is used to achieve a macroscopic alignment of chromophores within the core polymer material responsible for the electro-optic effect in nonlinear electro-optic polymers. FIG. 4a shows the operating distance of the poling voltage in a conventional device and FIG. 4b shows the operating distance of the poling voltage in an arrangement of the present invention. FIG. 4a shows that the poling voltage field must extend from the top electrode at 401 across the passive polymer cladding layer at 402, through the nonlinear optical polymer core layer at 403, across the second passive polymer cladding layer at 404 until the second metal layer at 405, or ground. As shown in FIG. 4a, the electrical field must extend across the entire triple stack configuration of approximately 6–8 microns thickness, in order to pole the nonlinear optical polymer core layer to produce the nonlinearity of the core material needed for operation of the device. With a typical poling voltage of 150 volts per micron of material, this 6–8 microns of thickness equates to a poling voltage approximately 900–1200 volts.

By contrast, FIG. 4b shows that the poling voltage field for an arrangement of the present invention to originate at top metal layer 406, conduct along the metal pathway 411 through the passive polymer cladding layer 413. The voltage field then operates from the conductive polymer sheet layer 407 through the nonlinear optical polymer core layer at 408 to the second conductive polymer sheet layer at 409, a distance of only 1 micron. Accordingly, the poling voltage required to pole the nonlinear optical polymer core layer using the device of the present invention is approximately 150 volts, much less than the 900–1200 volts required to pole the core layer of conventional devices. The electric field lines extend along the pathway of conductive polymer material 412 located in the passive polymer cladding layer 414 and terminates at electrical ground 410.

It should be appreciated that even though the electrical aspects of the FIG. 4b arrangement of the present invention pass over or ignore the presence of the electrically passive polymer layers 413 and 414 in FIG. 4b, these layers are nevertheless significant with respect to optical properties of the FIG. 4b device. These layers in fact serve to reduce optical signal propagation losses incurred in the FIG. 4b device. The optical signal propagation loss prevention is in small part achieved by the electrically conductive polymer layers 407 and 409, however, these layers are so thin as to need supplementation by the layers 413 and 414.

A poling voltage of 150 volts allows the transverse electro-optic device to be fabricated as part of an electronic integrated circuit chip that can be poled insitu, within the integrated circuit chip, without harming other electronic or electro-optic devices. This feature of the present invention is a major advantage over conventional devices which are not capable of monolithic inclusion into an integrated circuit chip because a 900–1200 volt poling of the polymer core material of the device prior to operation of the device cannot be practically accomplished on an integrated circuit chip containing other electronic devices. The 900–1200 volts required for poling would tend to disable the other devices. A conventional nonlinear optical polymer transverse electro-optic device would have to be poled on a separate substrate which precludes inclusion in an integrated circuit chip. The lower poling voltage which prevails for the nonlinear optical polymer transverse electro-optic device of the present invention provides significant additional advantages with respect to the electrical signal generating circuits needed to operate the device.

The voltage needed for electro-optic control is represented mathematically by the equation $$V = d\lambda / n^3 r_{33} L \qquad \text{Eq. 1}$$

where V is the switching or modulation voltage, d is the separation between electrodes, $\lambda$ is the wavelength, n is the refractive index of the core material, $r_{33}$ is the electro-optic coefficient of the core material and L is the length of the device. The required distance over which the switching or modulation of light occurs, i.e. the interaction length L, is determined by the thickness and index of refraction of the core and cladding layers of the waveguides, the wavelength, electro-optic coefficient and applied voltage of such a device. From Eq. 1 it can be seen that, with applied voltage remaining constant or reduced, a reduced separation between electrodes, as occurs in the device of the present invention, necessarily results in a reduced interaction length, L. A conventional nonlinear optical polymer transverse electro-optic device is typically 14 to 27 millimeters in length at a wavelength of 830 nanometers. By contrast, the arrangement of the present invention employing both conductive polymer sheet layers and passive polymer cladding layers can operate at lengths as short as 2.3 millimeters at a wavelength of 830 nanometers. Such lengths can be achieved using a nonlinear optical polymer material with an electro-optic coefficient of 18 picometers/volt in the core layer 301. A 2.3 millimeter long device can be integrated into an electronic multichip module scale circuit and combined with integrated circuit chip scale electronics while maintaining TTL switching voltage of 5VDC.

The reduced length of the arrangement of the present invention has the added benefit of reducing the required thickness of both the nonlinear optical polymer core layer and the passive polymer cladding layers. The shorter the device length, the shorter the distance the optical signal has to travel, so more propagation loss of the material can be tolerated relative to conventional devices. Therefore, both the nonlinear optical polymer core layer and the passive polymer cladding layers can be a lesser thickness than the same layers in conventional devices.

Additionally, with a shortened device length, there is inherently less optical signal propagation loss. The degree of propagation loss is significant in the arrangement of the present invention because the use of electrically conductive polymer sheet layers surrounding a polymer layer transmitting high data rate optical signals would generally generate noise and erroneous optical signals. Further, the conductive polymer sheet layers, in the presence of high data rate optical signals, would begin to operate in the manner of an antenna and interfere with operation of electronic devices in close proximity. Conventional electro-optic switching devices employ passive polymer cladding layers to confine, or reduce propagation loss of the optical signal in the nonlinear optical polymer core layer. In contrast, a conductive polymer material, as is used in the sheet layers of the present invention, produces greater optical signal propagation loss when surrounding an optical signal transmitting layer for the same distance of optical signal traveled. However in the present invention, the reduced length of the switch along with the signal confining passive polymer cladding layers surrounding the conductive polymer sheet layers allows the propagation loss of the switch to, in fact, be less than the 3 decibels of conventional devices.

Figure 5:
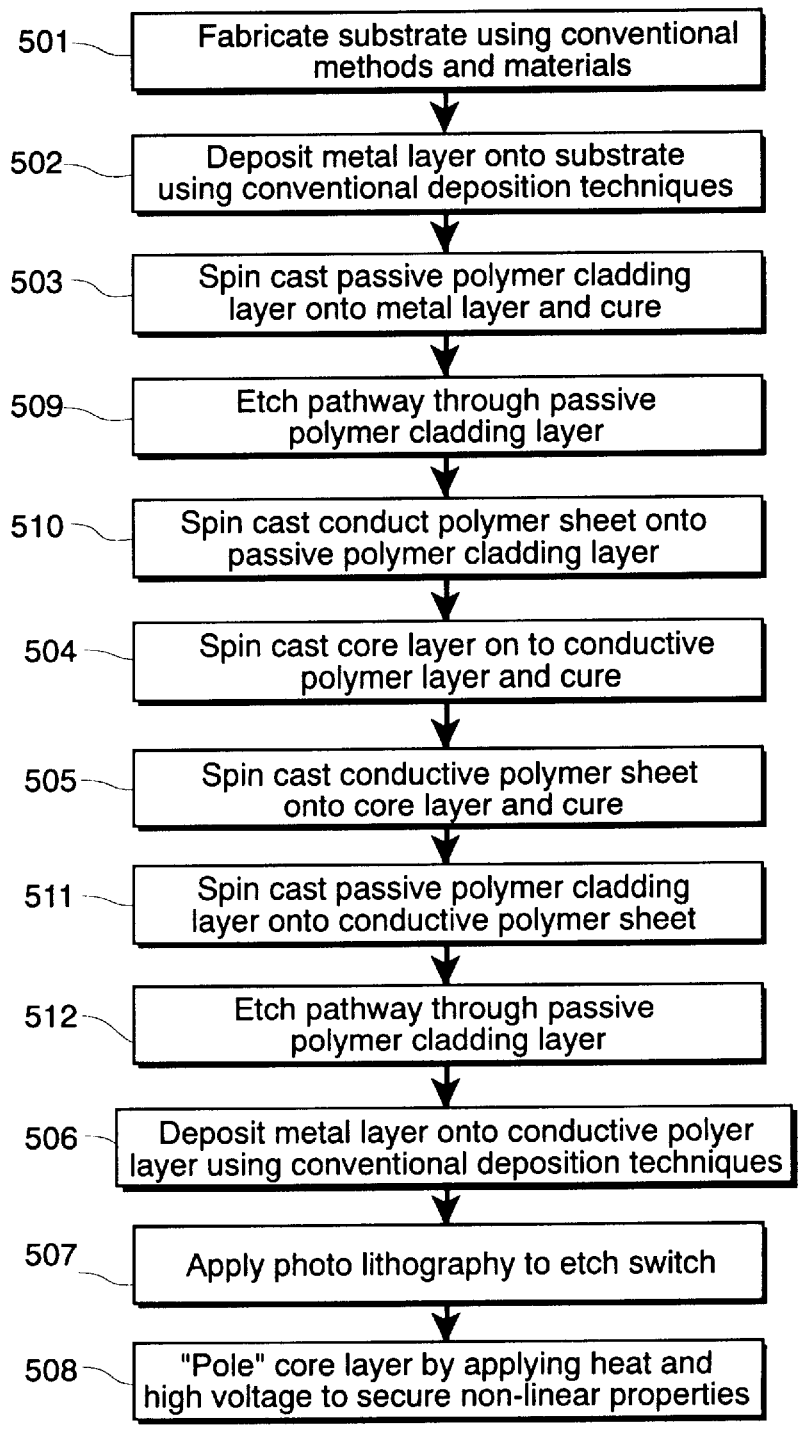
FIG. 5 shows a flow diagram representing the sequence of steps for fabricating a nonlinear optical polymer transverse electro-optic device in accordance with the present invention.

The arrangement of the present invention is attractive from a manufacturing standpoint because it can be fabricated using readily available equipment and techniques used in fabricating conventional electro-optic devices and electronic integrated circuits. In this regard, FIG. 5 is a flow diagram illustrating the steps for fabricating the nonlinear optical polymer transverse electro-optic device arrangement of the present invention. A substrate, 309 in FIG. 3, is first fabricated at block 501 in FIG. 5, using conventionally available methods and materials known in the semiconductor art. Possible substrate materials include semiconductor materials, metal materials, ceramic materials and polymer materials as well as combinations or mixtures thereof. Next a thin metal layer, 308 in FIG. 3, approximately 0.4 micron thick is deposited onto the substrate using conventional metal deposition techniques as set forth in block 502 in FIG. 5. Possible metal layer materials include gold, aluminum, titanium and tungsten as well as combinations or mixtures thereof. This thin metal layer 308 will operate as a ground electrode in the arrangement of the present invention.

An electrically passive polymer cladding layer 306 is spin cast onto the thin metal layer 308 and cured as set forth in block 503 in FIG. 5. An aperture or pathway, 302 or 307, is then etched into the passive polymer cladding layer 306 using photolithography, such pathway fabrication being set forth at 509 in FIG. 5. An electrically conductive polymer material is then spin cast onto the passive polymer cladding layer in a sheet, in a thin thickness of less than 0.1 micron, filling the aperture 307 within the passive polymer cladding layer 306 as set forth in block 510 of FIG. 5. Possible electrically conductive polymer materials include hydrochloric acid doped polyaniline, polypyrole, or any other conductive polymer including organic materials, inorganic materials, ceramic materials and metal materials as well as combinations or mixtures thereof.

The core layer 304, any nonlinear optical polymer material including organic materials, inorganic materials and ceramic materials as well as combinations or mixtures thereof, is spin cast onto the conductive polymer sheet layer 305 and subsequently cured as set forth in block 504 in FIG. 5. A second conductive polymer sheet layer 303 of less than 0.1 micron thickness is spin cast onto the nonlinear optical polymer core layer and subsequently cured as set forth in block 505 in FIG. 5. A second passive polymer layer 310 is then deposited onto the second conductive polymer sheet as set forth in block 511 in FIG. 5.

An aperture or pathway 302 is then etched into the second passive polymer layer 310 as set forth in block 512 of FIG. 5. After etching, a layer of metal 301 is deposited onto the passive polymer layer 310, filling in the pathway 302 so it is thereby conductive. After all the layers have been fabricated, the circuit is etched into the configuration of a transverse electro-optic device having the desired input and output waveguides by using photolithography as described in block 507 in FIG. 5. Finally the switch, and more specifically the polymer core layer 301, is poled by concurrently applying heat and a direct current voltage between metal layers 304 and 305 to secure the nonlinear properties of the core material as described in block 507 of FIG. 5. During the poling operation heat and DC voltage are applied to the device as per the polymer manufacturer's specifications to accomplish a satisfactory degree of poling in the nonlinear optical polymer material layer 304.

The present invention therefore provides a commercially attractive arrangement for monolithic integration of an high data rate nonlinear optical polymer transverse electro-optic device into an electronic integrated circuit chip and insertion into a multichip module. The invention provides for conductive polymer sheet layers immediately adjacent an optical signal transmitting nonlinear optical polymer core layer; this results in a reduced poling voltage and reduced length, allowing nonlinear optical polymer transverse electro-optic device inclusion into electronic integrated circuit chips of a size compatible with multichip module integration. The arrangement and method of the present invention may be used to fabricate a wide variety of nonlinear optical polymer transverse electro-optic devices including directional couplers, transverse electro-optic modulators and interferometers such as Mach Zehnder interferometers.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A minimal propagation loss and integrated circuit size-compatible electrically controlled nonlinear optical polymer-based transverse electro-optic device for switching and modulating a high data rate optical signal comprising:

a first electrically grounded metal layer overlaying a substrate layer and functioning as an electrical ground electrode;

a first electrically passive polymer layer cladding overlaying said first metal layer and including therein an aperture communicating with said grounded metal layer;

a first electrically conductive polymer sheet layer overlaying said first electrically passive polymer layer, said electrically conductive polymer sheet layer including an integral portion extending through said aperture of said first electrically passive polymer layer and making electrical contact with said first electrically grounded metal layer;

an optical signal transmitting nonlinear optical polymer core layer having electrically alterable molecular structure and optical refraction properties;

said nonlinear optical polymer core layer being capable of transmitting said optical signal in a predictably altered path therein upon application of a transverse electric field thereto;

a second electrically conductive polymer sheet layer overlaying said optical signal transmitting nonlinear optical polymer core layer, said first and second conductive polymer sheets being capable of establishing an electric field region encompassing said optical signal transmitting nonlinear optical polymer core layer in said electro-optic device;

a second electrically passive polymer cladding layer overlaying said second electrically conductive polymer sheet including an electrical conductor-receiving aperture therethrough;

a second metal layer overlaying said second electrically passive polymer cladding layer and interfacing an electro-optic device controlling electrical signal voltage source with extension of said second electrically conductive polymer sheet; and an electrical conductor member extending from said second electrically conductive polymer sheet layer through said conductor receiving aperture of said second electrically passive polymer cladding layer to said second metal layer.

2. The minimal propagation loss and integrated circuit size-compatible electrically controlled nonlinear optical polymer-based transverse electro-optic device of claim 1 wherein said electrical conductor member is comprised of second electrically conductive polymer sheet layer material.

3. The minimal propagation loss and integrated circuit size compatible electrically controlled nonlinear optical polymer-based transverse electro-optic device for switching and modulating high data rate optical signals of claim 1, wherein said first and second conductive polymer sheets are comprised of hydrochloric acid doped polyaniline.

4. The minimal propagation loss and integrated circuit size compatible electrically controlled nonlinear optical polymer-based transverse electro-optic device for switching and modulating high data rate optical signals of claim 3, wherein a thickness dimension of each of said first and second electrically conductive polymer sheet is 0.1 micron.

5. The minimal propagation loss and integrated circuit size-compatible electrically controlled nonlinear optical polymer-based transverse electro-optic device for switching and modulating high data rate optical signals of claim 3, wherein said optical signal transmitting nonlinear optical polymer core layer has a thickness of one micron or less.

6. The minimal propagation loss and integrated circuit size-compatible electrically controlled nonlinear optical polymer-based transverse electro-optic device for switching and modulating high data rate optical signals of claim 3, wherein said electrically passive polymer cladding layers each have a thickness of 2 microns.

7. The minimal propagation loss and integrated circuit size-compatible electrically controlled nonlinear optical polymer-based transverse electro-optic device for switching and modulating high data rate optical signals of claim 3, wherein said high data rate optical signals have a propagation loss less than 3 decibels.

8. The minimal propagation loss and integrated circuit size-compatible electrically controlled nonlinear optical polymer-based transverse electro-optic device for switching and modulating high data rate optical signals of claim 3, wherein said nonlinear optical polymer core layer has a thickness responsive to a poling voltage between 150 and 200 volts.

9. The minimal propagation loss and integrated circuit size-compatible electrically controlled nonlinear optical polymer-based transverse electro-optic device for switching and modulating high data rate optical signals of claim 3, wherein said electro-optic device has a length of less than 2.3 millimeter.

10. The minimal propagation loss and integrated circuit size-compatible electrically controlled nonlinear optical polymer-based transverse electro-optic device for switching and modulating high data rate optical signals of claim 1, wherein said first and second electrically conductive polymer sheets comprise a dielectric property-controlling electrical signal input port of said optical signal transmitting nonlinear optical polymer core layer.

11. A method for fabricating a high data rate nonlinear optical polymer transverse electro-optic device comprising the steps of:

depositing a first metal layer onto a substrate;

forming a first electrically passive polymer cladding layer onto said metal layer;

etching an aperture into said first electrically passive polymer layer;

forming a first electrically conductive polymer sheet onto said first electrically passive polymer cladding layer, said electrically conductive polymer sheet extending into said aperture of said electrically passive polymer cladding layer and physically and electrically contacting with said first metal layer;

forming an optical signal transmitting nonlinear optical polymer core layer onto said first electrically conductive polymer sheet;

forming a second electrically conductive polymer sheet onto said optical signal transmitting nonlinear optical polymer core layer;

forming a second electrically passive polymer cladding layer onto said second electrically conductive polymer charge sheet;

etching an aperture into said second electrically passive polymer cladding layer; and depositing a second metal layer onto said second electrically passive polymer cladding layer and said metal layer extending metal also into said aperture physically and electrically contacting said second electrically conductive polymer sheet.

12. The method for fabricating a nonlinear optical polymer transverse electro-optic device of claim 11, including the step of providing nonlinear, electro-optic properties in said high data rate optical signal-transmitting nonlinear optical polymer core layer by applying heat and direct current voltage thereto.

13. The method for fabricating a high data rate nonlinear optical polymer transverse electro-optic device of claim 12, wherein said direct current voltage is 150 volts.

14. The method for fabricating a high data rate nonlinear optical polymer transverse electro-optic device of claim 12, wherein each said forming steps include the step of spin coating.

15. The method for fabricating a high data rate nonlinear optical polymer transverse electro-optic device of claim 14, wherein said steps for fabricating said first and second conductive polymer sheet layers include spin coating hydrochloric acid doped polyaniline.

16. The method for fabricating a nonlinear optical polymer transverse electro-optic claim 11, wherein said first and second electrically conductive polymer sheet layers each achieve a conductive polymer layer thickness of less than 0.1 micron.

17. The method for fabricating a high data rate nonlinear optical polymer transverse electro-optic device of claim 11, wherein said step of spin casting a high data rate optical signal transmitting nonlinear optical polymer core layer achieves a 1 micron or less nonlinear optic polymer core layer.

18. An electrically controlled, nonlinear optical polymer material-based transverse electro-optic method for switching and modulating a high data rate optical signal comprising the steps of:

transmitting a high data rate optical signal through a plurality of waveguides integral with a nonlinear optical polymer core layer;

applying an electric field to said nonlinear optical polymer core layer, said electric field commencing at a first conductive polymer sheet layer adjacent a first lateral surface of said nonlinear optical polymer core layer and terminating at a second conductive polymer sheet layer adjacent a second lateral surface of said nonlinear optical polymer core layer, said electric field predictably altering an optical path curvature in said nonlinear optical polymer core layer; and confining said high data rate optical signal within said nonlinear optical polymer core layer with electrically passive polymer cladding layers, a combination of said electrically passive polymer cladding layers and first and second conductive polymer sheet layers contributing to low optical signal propagation loss of said high data rate optical signal;

said altering of said optical path curvature in said nonlinear optical polymer core layer achieving a corresponding altering of waveguides performing said optical signal steps.

19. The electrically controlled, nonlinear optical polymer material-based transverse electro-optic method for switching a high data rate optical signal of claim 18, wherein said step of applying an electric field to said nonlinear optical polymer core layer comprises supplying a first electrical potential to a first metallic layer communicating with said first conductive polymer sheet layer and a second electrical potential to a second metallic layer communicating with said second conductive polymer sheet layer.

* * * * *